United States Patent
Song

(10) Patent No.: US 10,634,072 B2
(45) Date of Patent: Apr. 28, 2020

(54) CONTROL METHOD AND CONTROL SYSTEM OF TURBOCHARGER FOR VEHICLE

(71) Applicants: HYUNDAI MOTOR COMPANY, Seoul (KR); KIA Motors Corporation, Seoul (KR)

(72) Inventor: Hyun Soo Song, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 582 days.

(21) Appl. No.: 15/363,705

(22) Filed: Nov. 29, 2016

(65) Prior Publication Data

US 2018/0066594 A1    Mar. 8, 2018

(30) Foreign Application Priority Data

Sep. 8, 2016  (KR) ........................ 10-2016-0115695

(51) Int. Cl.
  *F02D 41/00* (2006.01)
  *F02D 41/14* (2006.01)
  (Continued)

(52) U.S. Cl.
  CPC .......... *F02D 41/0007* (2013.01); *F02B 37/12* (2013.01); *F02D 11/02* (2013.01);
  (Continued)

(58) Field of Classification Search
  CPC ............ F02D 41/0007; F02D 41/2422; F02D 41/1498; F02D 41/064; F02D 41/04;
  (Continued)

(56) References Cited

U.S. PATENT DOCUMENTS 9,103,272 B2 *  8/2015  Buckland .............. F02B 37/183
9,127,626 B2 *  9/2015  Banker ................ F02M 31/042
(Continued)

FOREIGN PATENT DOCUMENTS

JP     H10-77856 A      3/1998
JP     2015-511685 A    4/2015
(Continued)

*Primary Examiner* — Mark A Laurenzi
*Assistant Examiner* — Edward Bushard
(74) *Attorney, Agent, or Firm* — Morgan, Lewis & Bockius LLP

(57) ABSTRACT

A control system includes a turbocharger having an exhaust air control device, sensors, and a controller for controlling a closing amount of the turbocharger using a cold data map. The exhaust air control device includes at least one of a waste gate or a vane angle control device. The controller performs a cold control step to control the closing amount to be a cold closing amount preset for a cold control when a vehicle condition satisfies a cold control condition. The controller also performs a cold data map application step to continuously change the closing amount while limiting a change rate of the closing amount of the turbocharger immediately after the cold control step to a predetermined reference change rate or lower, thereby preventing rapid changes in an engine RPM.

9 Claims, 7 Drawing Sheets

(51) Int. Cl.
*F02D 41/06* (2006.01)
*F02B 37/12* (2006.01)
*F02D 41/24* (2006.01)
*F02D 11/02* (2006.01)
*F02D 41/04* (2006.01)
*F02B 37/18* (2006.01)
*F02B 37/24* (2006.01)

(52) U.S. Cl.
CPC ........... *F02D 41/04* (2013.01); *F02D 41/064* (2013.01); *F02D 41/1498* (2013.01); *F02D 41/2422* (2013.01); *F02B 37/18* (2013.01); *F02B 37/24* (2013.01); *F02D 2200/021* (2013.01); *F02D 2200/501* (2013.01); *F02D 2200/602* (2013.01); *F02D 2200/703* (2013.01); *Y02T 10/144* (2013.01)

(58) Field of Classification Search
CPC ............... F02D 11/02; F02D 2200/703; F02D 2200/602; F02D 2200/021; F02D 2200/501; F02B 37/12; F02B 37/18; F02B 37/24; Y02T 10/144
See application file for complete search history.

(56) References Cited

U.S. PATENT DOCUMENTS

| | | | |
|---|---|---|---|
| 2012/0222418 A1* | 9/2012 | Watanabe | F02B 37/183 60/602 |
| 2014/0060009 A1* | 3/2014 | Zhang | F01N 3/18 60/274 |
| 2014/0366528 A1* | 12/2014 | Ricart-Ugaz | F01L 9/021 60/600 |
| 2015/0047342 A1* | 2/2015 | McConville | F02B 47/08 60/600 |
| 2015/0121862 A1* | 5/2015 | Wade | F02B 37/22 60/602 |
| 2015/0240707 A1* | 8/2015 | Wang | F02B 37/16 60/602 |

FOREIGN PATENT DOCUMENTS

| | | |
|---|---|---|
| KR | 10-2010-0052808 A | 5/2010 |
| KR | 10-2015-0124149 A | 11/2015 |
| WO | 2013/144481 A1 | 10/2013 |

\* cited by examiner

CONTROL METHOD AND CONTROL SYSTEM OF TURBOCHARGER FOR VEHICLE

CROSS REFERENCE TO RELATED APPLICATION

The present application claims the benefit of priority to Korean Patent Application No. 10-2016-0115695 filed on Sep. 8, 2016 with the Korean intellectual Property Office, the entire contents of which is incorporated herein for all purposes by this reference.

TECHNICAL FIELD

The present disclosure relates to a turbocharger for increasing an amount of intake air by using flow energy of exhaust air, and more particularly, to a control method and a control system of a turbocharger for a vehicle for preventing a rapid change in engine Revolutions Per Minute (RPM) that is generated by rapid change in a closing amount of the turbocharger.

BACKGROUND

In a case of a vehicle having a turbocharger, an exhaust air-controlling means, such as a waste gate or a vane angle control device of a turbine for controlling a load of the turbine by bypassing exhaust air flowing into the turbocharger, may be provided.

A turbocharger provided with the exhaust air controlling means as described above controls a closing amount of the turbocharger (that is, the closing amount of exhaust air controlling means provided in the turbocharger) to control an RPM thereof. Meanwhile, the turbocharger is an apparatus that boosts intake air. A boost pressure of intake air is changed according to the RPM of the turbocharger, thus it is important that the turbocharger is properly controlled when driving an engine to stably drive the engine.

The matters described as the related art have been provided only for assisting in the understanding for the background of the present disclosure and should not be considered as corresponding to the related art known to those skilled in the art.

SUMMARY

The present disclosure is intended to promote stable driving of a turbocharger at the time of cold start and prevent a rapid change in a closing amount of the turbocharger at the same time, thereby effectively preventing a rapid change in an engine RPM.

In order to achieve the above object, according to one aspect of the present disclosure, there is provided a control method of a turbocharger for a vehicle, including: a cold control step of controlling, by a controller, a closing amount of a turbocharger to be a cold closing amount preset for a cold control when a vehicle condition satisfies a cold control condition; and a cold data map application step of controlling, by the controller, the closing amount of the turbocharger according to an engine condition immediately after the cold control step, and using a cold data map having an allowable closing amount range expanded as compared to an allowable closing amount range of the turbocharger set in a normal data map to include the cold closing amount when the vehicle condition satisfies a cold data map application condition, to thereby continuously change the closing amount of the turbocharger immediately after the cold control step and prevent rapid change in an engine RPM.

The vehicle condition may include at least one of cooling water temperature, a vehicle speed, atmospheric pressure, atmospheric temperature, and a pressed amount of an accelerator pedal.

In the cold data map application step, the controller may continuously change the closing amount of the turbocharger while limiting a change rate of the closing amount of the turbocharger immediately after the cold control step to be a reference change rate or lower.

The cold control step may include a first control step of controlling, by the controller, the closing amount of the turbocharger to be a first closing amount among the cold closing amounts when the vehicle condition satisfies a first control condition among the cold control conditions, and a second control step of controlling, by the controller, the closing amount of the turbocharger to a second closing amount that is set to be larger than the first closing amount among the cold closing amounts when the vehicle condition satisfies a second control condition among the cold control conditions after the first control step.

In the first control step, the first closing amount may be set to have a smaller value as compared to the closing amount of the turbocharger that is determined according to the engine condition at the same point of time.

The cold control step may further include, between the first control step and the second control step, a linear change step of linearly changing, by the controller, the first closing amount that is the closing amount of the turbocharger immediately after the first control step to the second closing amount when the vehicle condition satisfies the second control condition.

In the linear change step, the controller may determine a transition time of the closing amount of the turbocharger according to the first closing amount, the second closing amount, and the vehicle condition, and change the closing amount of the turbocharger from the first closing amount to the second closing amount during the transition time.

In the cold control step, the controller may determine duration of the first control step and duration of the second control step according to the vehicle condition.

In the second control step, when the engine RPM is within a reference range and an elapsed time after start of an engine is within a predetermined time, if the vehicle condition satisfies the second control condition, the controller may control the closing amount of the turbocharger to be the second closing amount.

According to another aspect of the present disclosure, there is provided a control system of a turbocharger for a vehicle, including: a turbocharger including an exhaust air control device of which a closing amount is controlled to control an influence of exhaust air on rotation of a turbine; sensors measuring a vehicle condition and an engine condition; and a controller controlling the closing amount of the turbocharger to be a first closing amount among cold closing amounts when the vehicle condition measured by the sensors satisfies a first control condition among cold control conditions, linearly changing the closing amount of the turbocharger from the first closing amount to a second closing amount that is set to be larger than the first closing amount when the vehicle condition satisfies a second control condition among the cold control conditions, controlling the closing amount of the turbocharger to be the second closing amount when the vehicle condition satisfies the second control condition, and then controlling the closing amount of the turbocharger according to the engine condition and using a cold data map having an allowable closing amount range that is expanded as compared to an allowable closing amount range of the turbocharger set in a normal data map to include the cold closing amount when the vehicle condition satisfies a cold data map application condition to continuously change the closing amount of the turbocharger immediately after the cold control step and prevent rapid change in the engine RPM.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
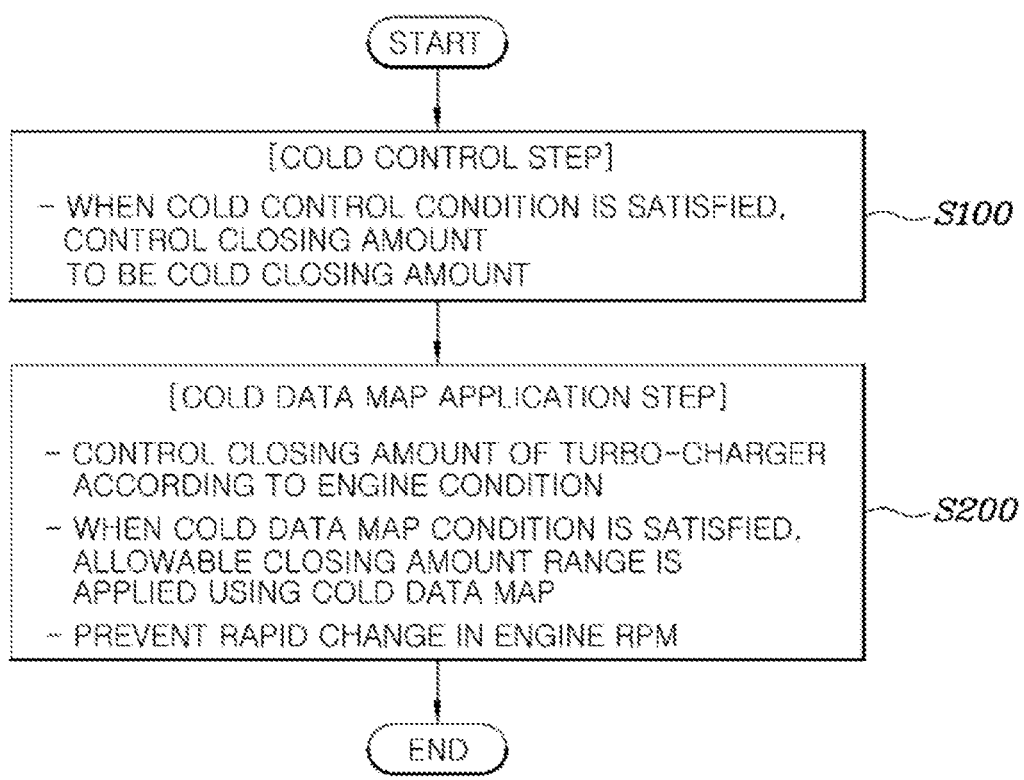
FIG. 1 is a flowchart showing a control method of a turbocharger for a vehicle according to exemplary embodiments of the present disclosure.
Figure 2:
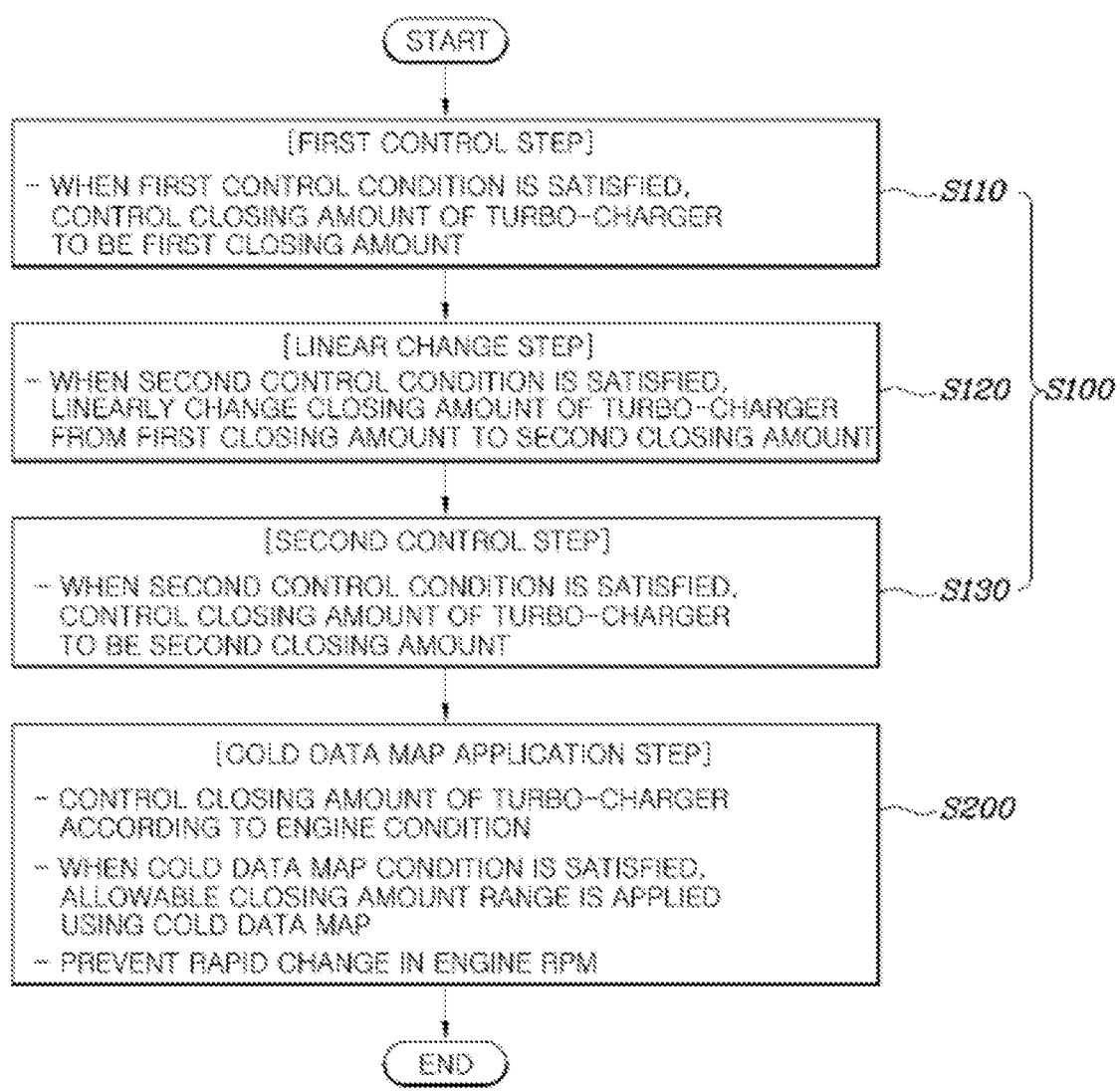
FIG. 2 is a flowchart showing a control method of a turbocharger for a vehicle according to exemplary embodiments of the present disclosure in which a first control step and a second control step of a cold control are included.
Figure 3:
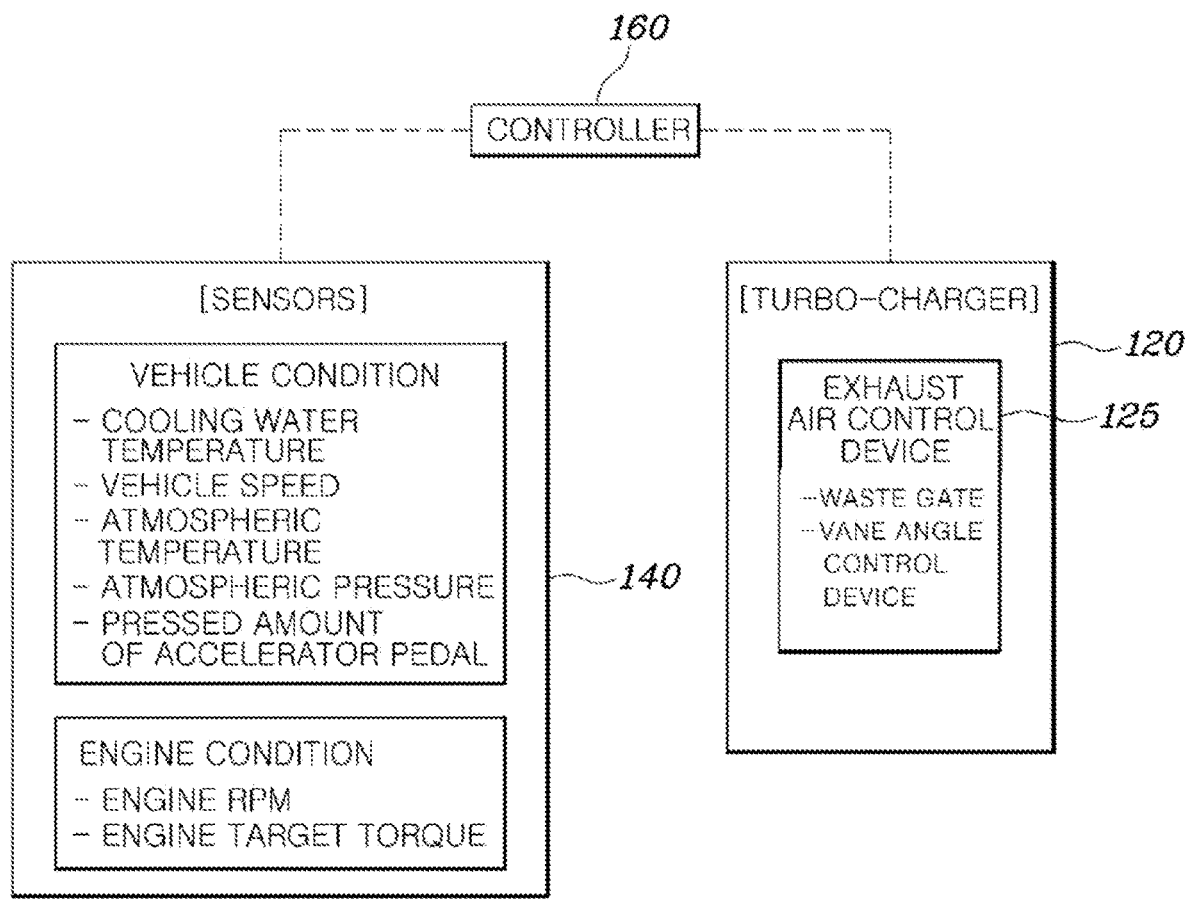
FIG. 3 is a view schematically showing a control system of a turbocharger for a vehicle according to exemplary embodiments of the present disclosure.

Hereinafter, exemplary embodiments of the present disclosure will be described with reference to the accompanying drawings.

A control method of a turbocharger for a vehicle according to exemplary embodiments of the present disclosure includes, as illustrated in FIGS. 1, 3 and 4 to 7, a cold control step S100 of controlling, by a controller 160, a closing amount of a turbocharger 120 to be a cold closing amount preset for a cold control when a vehicle condition satisfies a cold control condition. The control method also includes, in some embodiments, a cold data map application step S200 of controlling, by the controller 160, the closing amount of the turbocharger 120 according to an engine condition immediately after the cold control step S100, and using a cold data map having an allowable closing amount range expanded as compared to an allowable closing amount range of the turbocharger 120 set in a normal data map to include the cold closing amount when the vehicle condition satisfies a cold data map application condition, to thereby continuously change the closing amount of the turbocharger 120 immediately after the cold control step S100 and prevent rapid change in an engine RPM.

Described in detail, in the cold control step S100, in some embodiments, the controller 160 controls the closing amount of the turbocharger 120 to be the cold closing amount preset for the cold control when the vehicle condition satisfies the cold control condition.

The present disclosure particularly relates to a method for controlling a turbocharger 120 during a cold start of a vehicle. The vehicle condition according to the present disclosure includes at least one of cooling water temperature, atmospheric temperature, atmospheric pressure, a vehicle speed and/or a pressed amount of an accelerator pedal. Particularly, as a variable for determining whether there exists a cold situation, the cooling water temperature may be used.

The vehicle speed may be used as an index for denying the cold start situation since even if the cooling water temperature and the like satisfy the cold condition indicating that the vehicle is in a cold start situation, when the vehicle speed is a predetermined level or more, a temperature of devices in the vehicle is increased as the vehicle is driven. The pressed amount of the accelerator pedal may also be used as an index in the same manner as the vehicle speed.

Meanwhile, according to the present disclosure, the cold control condition means a condition representing a situation in which a special control (in the present disclosure, a cold control) for the turbocharger 120 according to the cold control situation is required. For example, when the cooling water temperature is a preset reference temperature or lower, in the present disclosure, it is determined that the cold control is required (in this case, the vehicle condition is the cooling water temperature, and the cold control condition is the reference temperature).

If it is determined that the vehicle condition satisfies the cold control condition, the controller 160 performs the cold control of the turbocharger 120. The cold control means a scheme for controlling a closing amount of the turbocharger 120 in the cold start situation that is preset in the controller 160.

The turbocharger 120 according to the present disclosure includes an exhaust air control device 125 for controlling a load of a turbine due to exhaust air. As the exhaust air control device 125, a waste gate for controlling an amount of exhaust air introduced into the turbocharger 120 or a vane angle control device for controlling kinetic energy of the exhaust air applied to the turbine of the turbocharger 120 may be used.

In the present disclosure, the exhaust air control device 125 is understood as a part of the turbocharger 120, and a closing amount of the exhaust air control device 125 is represented as a closing amount of the turbocharger 120. That is, in the present disclosure, a situation in which a closing amount of the turbocharger 120 is decreased means a situation in which an amount of exhaust air bypassing the turbine is increased or a vane angle of the turbine is changed to reduce kinetic energy of the exhaust air applied to a vane. As a result, an RPM of the turbine is decreased.

The engine condition may include an engine RPM and an engine torque, and a value corresponding thereto may include an exhaust pressure or an amount of exhaust air in the corresponding situation.

In the cold start situation, damage may be caused by an increase in the RPM of the turbocharger in a state in which oil for lubricating the turbocharger 120 is not sufficiently supplied to the turbocharger 120. Alternatively, if atmospheric temperature is equal to or lower than a predetermined temperature, an engine driving state or the RPM of the turbocharger 120 may be abnormal.

The cold control in the present disclosure means a control mode other than a normal control mode, for controlling a closing amount of the turbocharger 120 to solve a problem that may occur due to the cold start situation of the vehicle as described above (corresponding to a pre-control step of the turbocharger).

As an example of the cold control, a method for controlling a closing amount of the turbocharger 120 by fixing the closing amount of the turbocharger 120 to a predetermined value that is experimentally determined but not determined according to the engine condition, may be used. Further, a method of using the fixed value for increasing the closing amount of the turbocharger as compared to that of a normal control state in order to prevent over RPM of the turbocharger 120 before the oil is sufficiently supplied to the turbocharger 120 in the cold situation, may be used.

Figure 5:
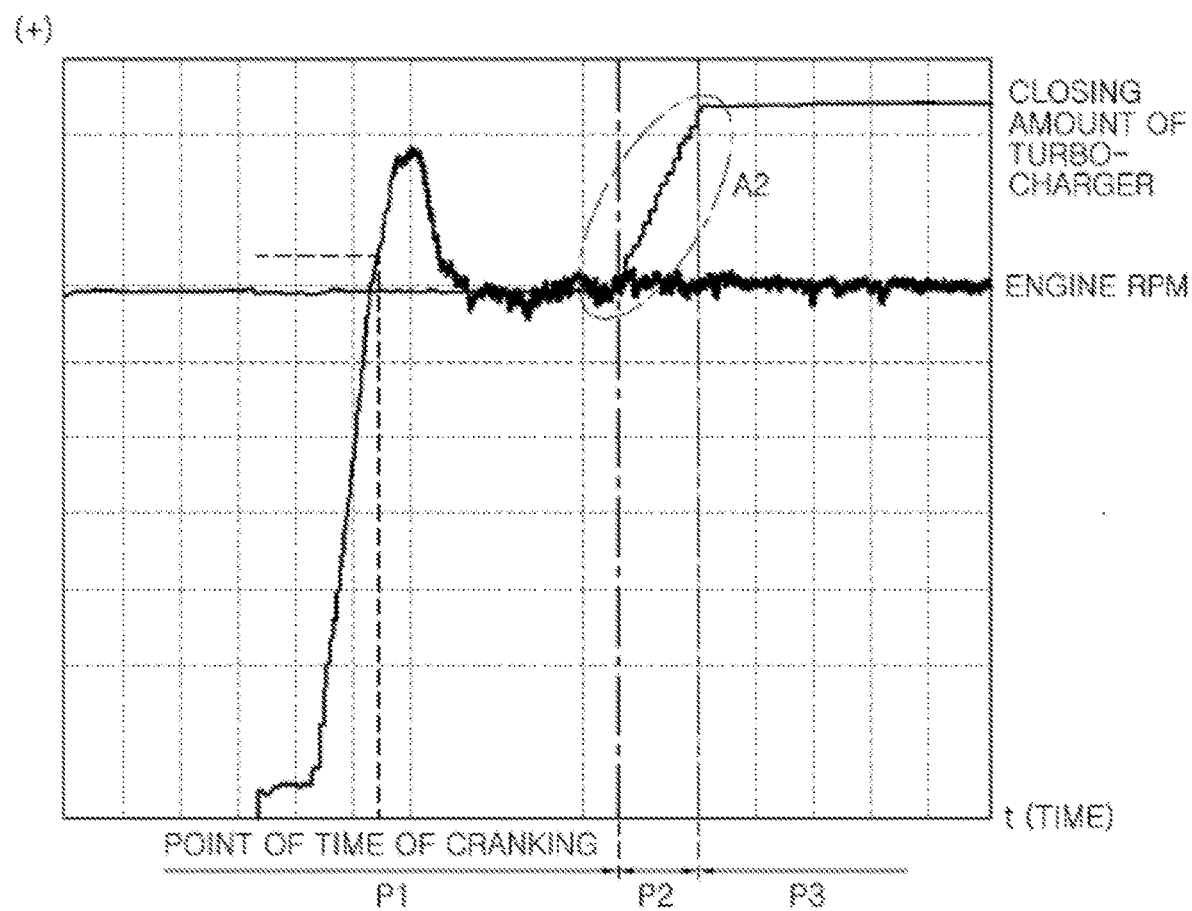
FIG. 5 is a graph showing a control of a closing amount of a turbocharger to which a linear change step by the control method of a turbocharger for a vehicle according to exemplary embodiments of the present disclosure is applied.
Figure 7:
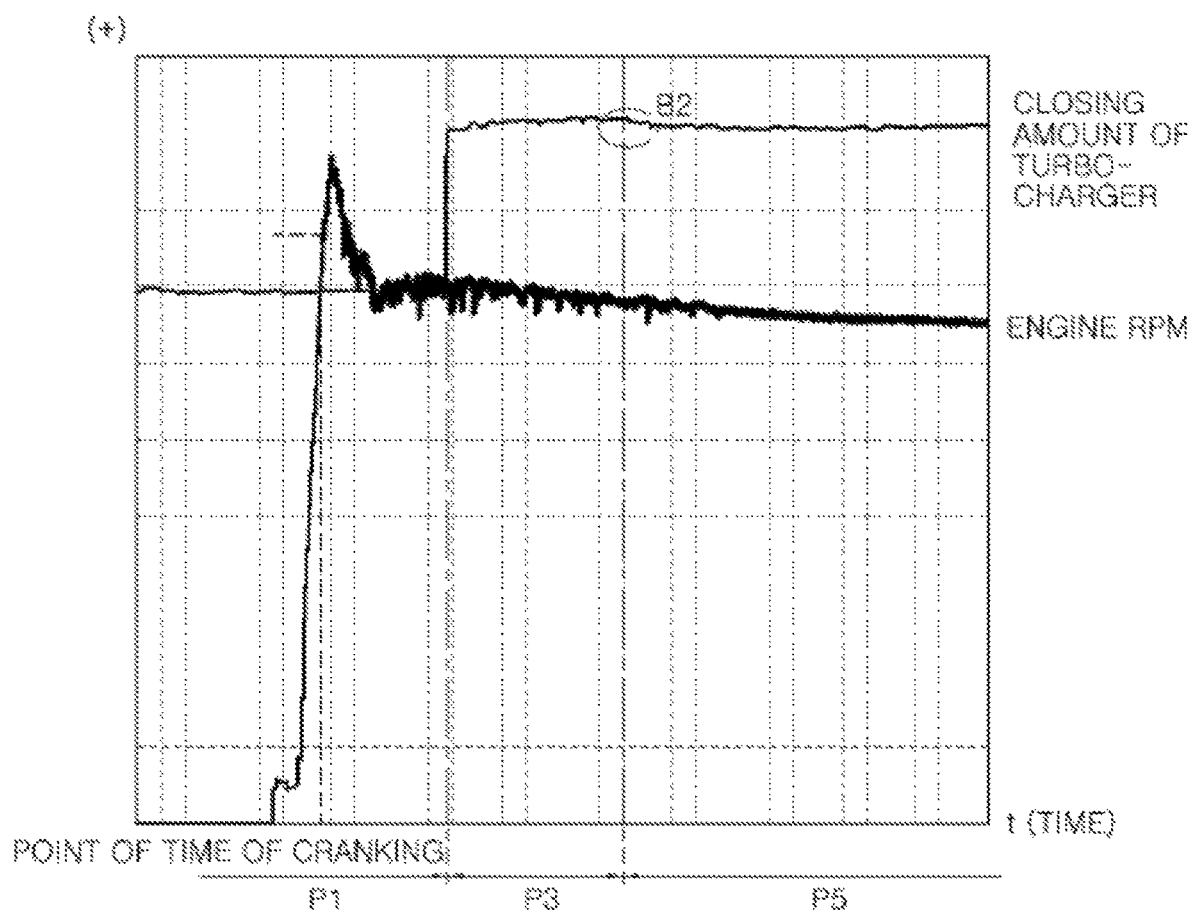
FIG. 7 is a graph showing a control of a closing amount of a turbocharger to which a cold data map application step by the control method of a turbocharger for a vehicle according to exemplary embodiments of the present disclosure is applied.

In addition to the methods described above, there may be various examples of a detailed aspect of the cold control. In FIG. 5 or 7, as exemplary embodiments of the present disclosure, P1, P2 and P3 sections in which a cold control (a pre-control for a cold situation) that dictates that a closing amount of the turbocharger 120 is fixed or linearly changed (application of a ramp function) is performed are illustrated.

Meanwhile, in the cold data map application step S200, the closing amount of the turbocharger 120 is controlled by the controller 160 according to the engine condition immediately after the cold control step S100. When the vehicle condition satisfies the cold data map application condition, the cold data map having the allowable closing amount range expanded as compared to the allowable closing amount range of the turbocharger 120 set in the normal data map to include the cold closing amount is used, such that the closing amount of the turbocharger 120 immediately after the cold control step S100 is continuously changed and rapid changes in the engine RPM are prevented.

The controller 160 controls the closing amount of the turbocharger 120 in real time according to the engine condition as soon as the cold control step S100 ends. That is, the cold control is performed to improve the cold start situation, and when the cold control ends, the closing amount of the turbocharger 120 is normally controlled again.

In this case, the controller 160 controls the turbocharger 120 using a data map (corresponding to a PCR_rGOVMAX map) in which the closing amount of the turbocharger 120 is preset according to the engine condition. In the data map, an allowable closing amount range of the turbocharger 120 is set in order to prevent damage caused by an over RPM of the turbocharger 120.

The data map (PCR_rGOVMAX map) may be a map for a closing amount determined in a situation in which the allowable closing amount range of the turbocharger 120 is limited for each engine condition, or may be a map in which a limit value for the closing amount of the turbocharger 120 that is determined for each engine condition is set. Examples of the data map may be different and varied, but share an aspect in that the data map is a map in which an allowable closing amount range of the turbocharger 120, or a limit for the closing amount of the turbocharger 120, is determined for each engine condition in the present disclosure.

When performing the normal control, the controller 160 uses the data map for determining the closing amount of the turbocharger 120 or the allowable closing amount range. According to the present disclosure, the controller 160 selects any one of a plurality of data maps pre-stored in the controller 160 according to the vehicle condition, and in particular, in a case in which the vehicle condition satisfies a cold data map condition, the controller 150 controls the closing amount of the turbocharger 120 using the cold data map (corresponding to a PCR_rGOVMAX map applied at the time of cold control).

The cold control condition or the cold data map condition according to the present disclosure are separate conditions but may also be set to have the same value. That is, they may be variously determined in consideration of experimental results and strategic control aspects of a vehicle.

As an example, when the cooling water temperature as a vehicle condition has a value equal to or lower than a predetermined temperature as a cold data map condition, the controller 160 applies the cold data map to control the closing amount of the turbocharger for each engine condition.

In the cold data map which is a data map set for the cold start situation, the allowable closing amount range of the turbocharger 120 is set to be a value, or range, that is more expanded, or greater, as compared to the normal data map for a normal driving situation for the same engine condition.

The allowable range generally is to prevent damage by limiting a maximum RPM of the turbocharger 120. Thus it may be understood that the expansion of the allowable range means a situation in which a minimum value of the closing amount of the turbocharger 120 that is allowed for the corresponding engine condition is further decreased such that the maximum RPM allowed for the turbocharger is increased. The maximum value of the closing amount may also be increased by the expansion of the allowable range.

In controlling the closing amount of the turbocharger 120, when the cold data map is applied, the closing amount of the turbocharger 120 may be controlled to have a larger value as compared to a case of performing the normal control (the RPM of the turbocharger 120 may be controlled to be further increased).

In the cold start situation, since a temperature of intake air is low and an amount of intake air is different from that in a normal case, the engine RPM may not be stable. In the present disclosure, in order to improve such a situation, the turbocharger 120 is controlled to have a smaller closing amount as compared to the normal case at an initial stage of the cold start to increase the RPM of the turbocharger 120, such that the cold control for stabilizing the engine RPM by providing sufficient intake air to the engine may be performed.

However, when the turbocharger 120 is controlled using the normal data map (a PCR_rGOVMAX map applied at the time of normal control) after the cold control ends, a situation in which the closing amount of the turbocharger 120 for the cold control deviates from the allowable range set for stable driving of the turbocharger 120 may occur.

Figure 6:
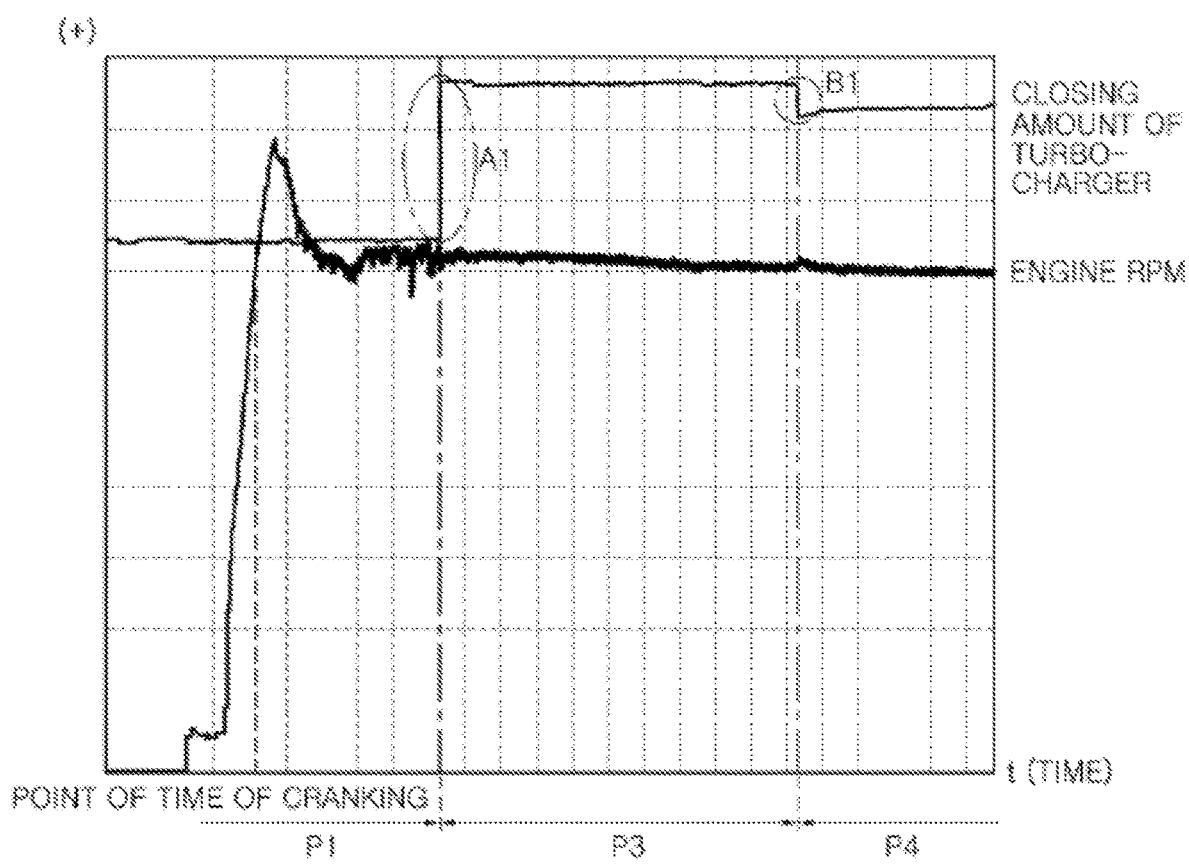
FIG. 6 is a graph showing a control of a closing amount of a turbocharger to which a cold data map application step by the control method of a turbocharger for a vehicle according to exemplary embodiments of the present disclosure is not applied.

In FIG. 6, a P4 section in which the controller 160 controls the closing amount of the turbocharger 120 using the normal data map after the P3 section in which the cold control is performed is illustrated.

In the corresponding graph, it is illustrated that since the allowable closing amount of the turbocharger 120 under the corresponding driving condition based on the normal data map does not include the closing amount of the turbocharger 120 controlled in the P3 section, a discontinuous change B1 in the closing amount is generated after the P3 section in which the turbocharger 120 is controlled by fixing the closing amount to a relatively large value so that the RPM of the turbocharger 120 is increased to stabilize the engine RPM in the cold start situation.

As such, when the closing amount of the turbocharger 120 is rapidly changed to a discontinuous value, an amount of intake air introduced into the engine and a pumping loss of the engine during air exhaust are rapidly changed, such that the engine RPM is rapidly changed.

The present disclosure uses the cold data map in which the allowable closing amount range of the turbocharger 120 is expanded to include the closing amount of the turbocharger controlled in the P3 section as the cold control, in order to prevent rapid changes in the engine RPM as described above.

A graph applying the cold data map in which the allowable range is expanded as described above is illustrated in FIG. 7. Unlike FIG. 6, in which the discontinuous change B1 in the closing amount is generated since the allowable closing amount range does not include the closing amount of the turbocharger 120 at the time of the end of the cold control as the normal data map is used, FIG. 7 illustrates a P5 section in which a closing amount of the turbocharger 120 is controlled while being continuously changed B2 from the closing amount of the turbocharger at the time of the end of the cold control as the allowable closing amount range is expanded to include the closing amount of the turbocharger 120 at the time of the end of the cold control.

As a result, in the present disclosure, when the controller 160 normally controls the turbocharger 120 of the vehicle after the cold control that is set for the cold start situation, the cold data map having the allowable closing amount range that is expanded to include the closing amount at the time of the cold control is used in order to prevent the discontinuous change in the closing amount that is generated since the allowable closing amount range does not satisfy the closing amount at the time of the cold control. Thus, this thereby prevents the discontinuous change in the closing amount that is generated after the cold control is performed and continuously changes the closing amount to effectively prevent rapid changes in the engine RPM.

Meanwhile, in the control method of a turbocharger for a vehicle according to exemplary embodiments of the present disclosure, the vehicle condition includes at least one of cooling water temperature, a vehicle speed, atmospheric pressure, atmospheric temperature and/or a pressed amount or degree of an accelerator pedal.

In detail, according to the present disclosure, the vehicle condition is a variable for determining whether the condition for performing each control step that is set in the controller 160 for the cold start situation is satisfied. In particular, to determine whether there exists the cold situation, according to exemplary embodiments of the present disclosure, the cooling water temperature, the atmospheric pressure, the atmospheric temperature, and the like are included as the vehicle condition as described above.

The above variables are indices for recognizing that the cold situation exists, and the atmospheric pressure may act as a variable for more accurately determining the cold situation by assisting in the determination of the controller 160 based on the cooling water temperature and the atmospheric temperature.

Meanwhile, the vehicle speed and the pressed amount, or degree, of the accelerator pedal that may be included as the vehicle condition may be used as an index for determining whether the control for the cold situation actually needs to be applied by assisting in the determination based on the cooling water temperature and the like.

For example, even in a case in which the cooling water temperature has a value equal to or lower than a predetermined temperature set in the controller 160, and it is determined that there exists the cold start situation, if the vehicle speed or the pressed amount of the accelerator pedal has a value equal to or greater than a predetermined value, it means that the vehicle has started to drive and it is predicted that internal temperature of the vehicle will rapidly rise. Thus, the controller 160 does not perform a control for the cold start situation.

As a result, according to exemplary embodiments of the present disclosure, the atmospheric temperature, the atmospheric pressure, the vehicle speed, and/or the pressed amount of the accelerator pedal in addition to the cooling water temperature are used as the vehicle condition to determine whether to perform the control for the cold situation of the vehicle, thereby making it possible to reliably determine whether the controls for the cold start situation are required.

Meanwhile, in the control method of a turbocharger for a vehicle according to exemplary embodiments of the present disclosure, in the cold data map application step S200, the controller 160 continuously changes the closing amount of the turbocharger 120 while limiting a change rate of the closing amount of the turbocharger 120 immediately after the cold control step S100 to be a reference change rate or lower.

The present disclosure prevents the discontinuous change of the closing amount of the turbocharger 120 that is generated when the normal control is performed after the cold control as described above.

However, even in a case in which the cold data map in which the allowable closing amount range is expanded to include the closing amount at the time when the cold control is used when performing the normal control in order to achieve such improvement, if the closing amount at the time of the end of the cold control is changed at a predetermined rate or higher, rapid changes in the engine RPM may eventually be caused.

Therefore, in exemplary embodiments of the present disclosure, the closing amount of the turbocharger 120 is continuously changed while limiting the change rate of the closing amount of the turbocharger 120 immediately after the cold control step S100 to be a reference change rate or lower.

The reference change rate is a value determined by experimentally or theoretically deciding an allowable level of change in the engine RPM and specifying a change rate of the closing amount of the turbocharger 120 satisfying such an allowable level. That is, the reference change rate is a value that may be variously determined in consideration of strategic control aspects, and is a criterion for preventing rapid changes in the engine RPM.

Meanwhile, as shown in FIGS. 1 to 7, in the control method of a turbocharger for a vehicle according to exemplary embodiments of the present disclosure, the cold control step S100 includes a first control step S110 of controlling, by the controller 160, the closing amount of the turbocharger 120 to be a first closing amount among the cold closing amounts when the vehicle condition satisfies a first control condition among the cold control conditions. The control method also includes a second control step S130 of controlling, by the controller 160, the closing amount of the turbocharger 120 to a second closing amount that is set to be larger than the first closing amount among the cold closing amounts when the vehicle condition satisfies a second control condition among the cold control conditions after the first control step S110.

Specifically, according to exemplary embodiments of the present disclosure, the cold control includes a first control and a second control. Therefore, in exemplary embodiments of the present disclosure, the cold control step S100 including the first control step S110 and the second control step S130 is performed.

In the first control step S110, when the vehicle condition satisfies the first control condition, the first control among the cold controls is performed. In the first control, the closing amount of the turbocharger 120 is fixed to a predetermined value regardless of the engine condition to be controlled.

In this case, the controller 160 fixes the closing amount of the turbocharger 120 to a first closing amount that is preset as the predetermined value, and may control the closing amount of the turbocharger 120 to be the first closing amount to prevent an unnecessary over RPM, or overspeed, of the turbocharger 120.

At the initial stage of the cold start situation, since a temperature of the oil or the like is low, a supply of the oil for lubricating the turbocharger 120 is delayed as compared to the normal situation where the cold situation does not exist. In this situation, when the RPM of the turbocharger is excessively increased as the engine starts, a rotating body (compressor, turbine, rotating shaft or the like) of the turbocharger 120 may be excessively worn out, or stressed, such that durability may deteriorate. Specifically, if the RPM of the turbocharger 120 is excessively increased, damage to the turbine may occur due to frictional resistance from rotation from excessive energy of exhaust air.

Accordingly, in the first control step S110, if the vehicle condition satisfies the first control condition determined in consideration of various experimental results and strategic control aspects, the controller 160 controls the turbocharger 120 with, or according to, the first closing amount that may be set to be larger than in the case of the normal control, thereby preventing durability deterioration and damage caused by an over RPM of the turbocharger 120.

In FIGS. 4 to 7, the P1 section in which the closing amount of the turbocharger 120 is fixed to the first closing amount, as described above, is illustrated. In the corresponding graph, as can be inferred from the later closing amount, it may be appreciated that a value of the first closing amount is set to be relatively smaller than that of the normal situation.

Meanwhile, according to exemplary embodiments of the present disclosure, the second control is performed as the cold control after the first control is performed. To this end, after the first control step S110, the controller 160 performs the second control step S130 when the vehicle condition satisfies the second control condition.

The first control condition and the second control condition may have different values. Respective values may be variously determined in consideration of experimental results and strategic control aspects, and when the cooling water temperature as one of various vehicle conditions is used, the second control condition may correspond to a lower temperature value than that of the first control condition.

That is, when the temperature is gradually decreased in the normal situation that does not correspond to the cold situation, thus satisfying the first control condition, the controller 160 performs the first control as the cold control, and when at a lower temperature, the controller 160 performs the second control after the first control. However, such a conditional relationship may be variously determined in consideration of a strategic aspect.

The first control and the second control should be understood as a control separate from the application of the cold data map described above. Further, the cold data map condition and the first or second control condition are values that may be distinguished from each other, and preferably, the cold data map condition is a value that may be satisfied when the second control is performed. That is, when the cooling water temperature is described as a reference, the cold data map condition may be set to have a temperature value equal to or lower than the second control condition.

When the vehicle condition such as the cooling water temperature satisfies the second control condition, the controller 160 controls the turbocharger 120 with the second closing amount, that is larger than the first closing amount, after the end of the first control for controlling the closing amount of the turbocharger 120 to be the first closing amount.

As described above, after the first control that the closing amount is set to be small in order to prevent an over RPM of the turbocharger 120 at the initial stage of the cold start at which the supply of the oil for lubricating the turbocharger 120 may be delayed, a combustion status in the engine may be unstable due to intake air characteristics in the cold situation or the first control.

That is, in the cold start situation, the engine RPM may be repeatedly changed, and thus may be unstable due to unstable combustion in the engine. In order to improve combustion stability of the engine in the cold situation, the controller 160 performs the second control.

In exemplary embodiments of the present disclosure, when the first control ends, it is decided that the supply of the lubricating oil is normally completed. This means that a risk of damage caused by an over RPM of the turbocharger 120 is largely decreased as compared to a state immediately after the cold start.

Meanwhile, in order to improve a state in which as the atmosphere temperature or the cooling water temperature is further decreased in the cold situation, the engine RPM is unstable due to unstable intake air temperature and the amount of intake air, the second control is performed. The second closing amount set in the second control has a larger value that the first closing amount, such that the RPM of the turbocharger 120 is increased and a level of supercharging of the intake air is improved.

Consequently, according to exemplary embodiments of the present disclosure, the first control and the second control are performed as the cold control. The first control is performed to prevent an over RPM of the turbocharger 120 at the initial stage of the cold start to thereby decrease the risk of damage to the turbocharger 120, and the second control is performed to solve an instability of the engine combustion due to the cold start to thereby stabilize the engine RPM.

FIGS. 4 to 7 illustrate the P1 section in which the first control of controlling the turbocharger 120 with the first closing amount corresponding to a relatively smaller value as compared to the normal control (refer to the P4 section and the P5 section) in order to prevent an over RPM of the turbocharger 120 is performed, and the P3 section in which the turbocharger 120 is controlled with the second closing amount corresponding to a larger fixed value as compared to the first closing amount in order to stabilize the engine RPM by improving the combustion stability of the engine after the P1 section is performed.

In the P3 section, it may be confirmed that the closing amount of the turbocharger 120 is increased and the change in the engine RPM is rapidly reduced, unlike the P1 section in which the closing amount is relatively decreased to prevent an over RPM of the turbocharger before the lubricating oil is sufficiently supplied.

Meanwhile, as shown in FIGS. 4 to 7, according to the control method of a turbocharger for a vehicle according to exemplary embodiments of the present disclosure, in the first control step S110, the first closing amount is set to have a smaller value as compared to the closing amount of the turbocharger 120 that is determined according to the engine condition at the same point in time.

As described above, in order to prevent an over RPM of the turbocharger 120 before the oil for lubricating the turbocharger 120 is sufficiently supplied to the turbocharger 120 in the cold start situation, according to exemplary embodiments of the present disclosure, in the first control step S110, the closing amount of the turbocharger 120 is maintained to be the first closing amount having a smaller value as compared to the closing amount of the turbocharger 120 in the normal control that is determined according to the engine condition at the same point in time.

Meanwhile, as shown in FIGS. 4 to 7, in the control method of a turbocharger for a vehicle according to exemplary embodiments of the present disclosure, between the first control step S110 and the second control step S130, the cold control step S100 further includes a linear change step S120 of linearly changing, by the controller 160, the first closing amount that is the closing amount of the turbocharger 120 immediately after the first control step S110 to the second closing amount when the vehicle condition satisfies the second control condition.

In detail, according to exemplary embodiments of the present disclosure, the controller 160 performs the first control for preventing an over RPM of the turbocharger 120 and the second control for stabilizing the engine RPM as the cold control. However, as described above, when performing the first control and the second control, the controller 160 controls the closing amount of the turbocharger 120 with the first closing amount and the second closing amount that correspond to the fixed values when the first control and the second control are performed. Therefore, when the first control step S110 ends and then the second control step S130 is performed, a rapid change in the closing amount of the turbocharger 120 is generated.

Figure 4:
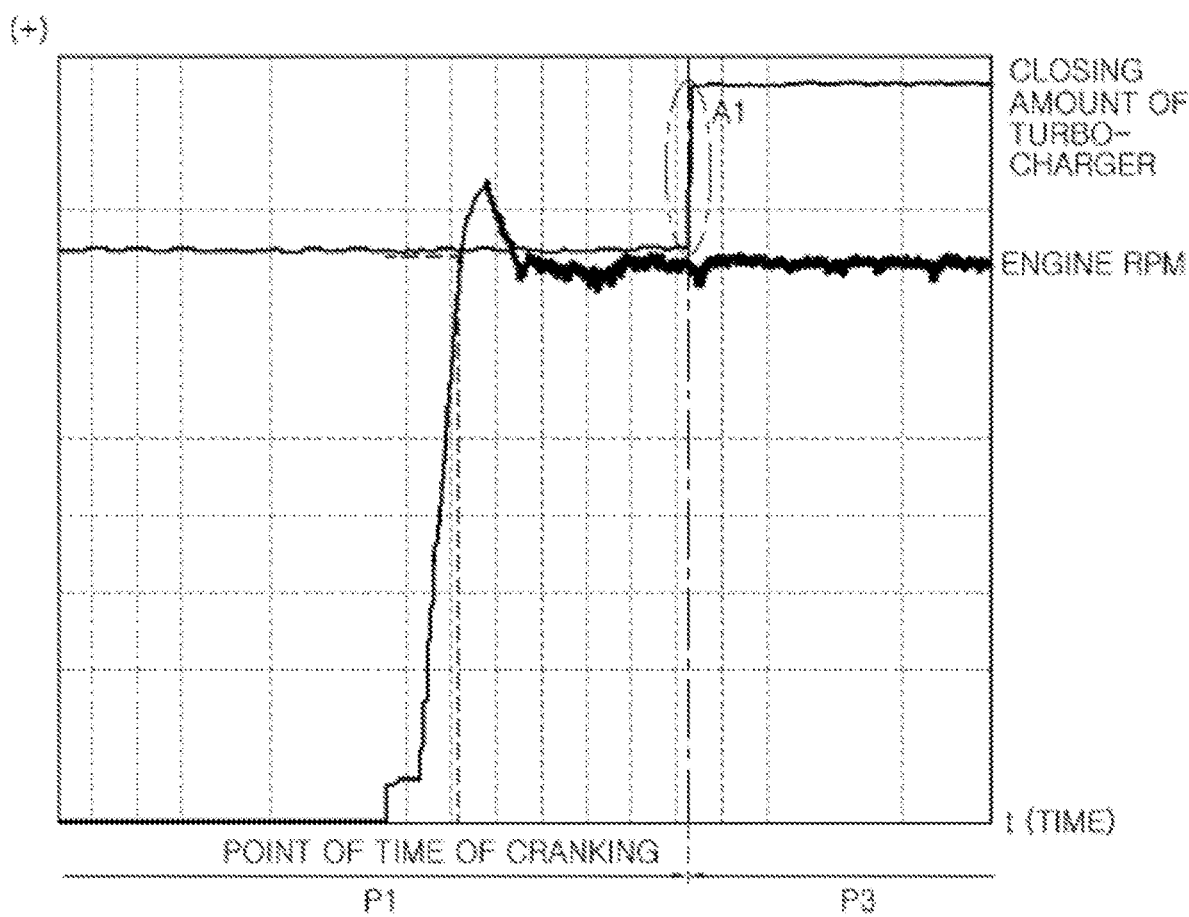
FIG. 4 is a graph showing a control of a closing amount of a turbocharger to which a linear change step by the control method of a turbocharger for a vehicle according to exemplary embodiments of the present disclosure is not applied.

Referring to FIGS. 4 to 6, it may be appreciated that at the point in time at which the P1 section of performing the first control is switched into the P3 section of performing the second control, the closing amount of the turbocharger 120 is rapidly changed A1 with a predetermined width, and the engine RPM becomes unstable and shows a rapid change due to a rapid change in the closing amount as described above at the corresponding point in time.

In order to prevent rapid changes in the engine RPM as described above, according to exemplary embodiments of the present disclosure, the linear change step S120 is performed between the first control step S110 and the second control step S130. The linear change step S120 prevents rapid changes in the closing amount of the turbocharger 120 by linearly changing the closing amount of the turbocharger 120 from the first closing amount to the second closing amount, thereby effectively preventing the generation of rapid changes in the engine RPM (which may be achieved through application of the ramp function).

Referring to FIG. 5, it may be appreciated that the P2 section that is the linear change step S120 is present between the P1 section and the P3 section, unlike FIG. 4. Accordingly, rapid changes in the engine RPM are not generated when the P1 section is switched to the P3 section, unlike FIG. 4.

Meanwhile, in the control method of a turbocharger for a vehicle according to exemplary embodiments of the present disclosure, in the linear change step S120, the controller 160 determines a transition time of the closing amount of the turbocharger 120 according to the first closing amount, the second closing amount, and the vehicle condition, and changes the closing amount of the turbocharger 120 from the first closing amount to the second closing amount during the transition time.

Specifically, in performing the linear change step S120, a time when the closing amount is changed from the first closing amount (fixed value) to the second closing amount (fixed value) is important. The reason is because a slope of change in the closing amount is determined depending on the transition time since a start value and an end value of the changed closing amount is already determined as the first closing amount and the second closing amount, respectively.

When the change in the closing amount has a large slope value, it is difficult to prevent the engine RPM from being rapidly changed. On the contrary, when the change in the closing amount has an excessively small slope value, the second control step S130 becomes less meaningful, and a situation in which the engine RPM is unstable may be excessively prolonged.

Therefore, according to exemplary embodiments of the present disclosure, the controller 160 sets the first closing amount and the second closing amount as the start value and the end value of the change in the closing amount, and controls the closing amount of the turbocharger 120 by determining the transition time according to the vehicle condition.

The transition time is a vehicle condition representing for example, the cold situation, and may be determined to be longer as, or when, the cooling water temperature is low. Accordingly, the change in the closing amount of the turbocharger 120 may be set to have a gentle slope as the cold situation is intensified, or the temperature is lower, to prevent rapid changes in the engine RPM due to the transition of the closing amount.

Meanwhile, in the control method of a turbocharger for a vehicle according to exemplary embodiments of the present disclosure, in the cold control step S100, the controller 160 determines a duration of the first control step S110 and a duration of the second control step S130 according to the vehicle condition.

Specifically, the first control step S110 and the second control step S130 improve the cold start situation. Therefore, as the cold situation is intensified, the duration may also be set to be longer. However, the duration may be strategically determined in terms of control, thus the duration of the first control step S110 may not be increased to a predetermined value or longer even when, for example, the cooling water temperature, as the vehicle condition, is further decreased, and the duration of the second control step S130 may be set to be longer as the cooling water temperature is decreased.

The above example is one of the exemplary embodiments of the present disclosure, and thus the duration may be strategically variously determined by a person having ordinary skill in the art as described above. Further, the first closing amount and the second closing amount may also be determined according to the one or more vehicle conditions.

Meanwhile, in the control method of a turbocharger for a vehicle according to exemplary embodiments of the present disclosure, in the second control step S130, when the engine RPM is within a reference range and an elapsed time after the start of the engine is within a predetermined time, if the vehicle condition satisfies the second control condition, the controller 160 controls the closing amount of the turbocharger 120 to be the second closing amount.

Specifically, even when, for example, the cooling water temperature as the vehicle condition satisfies the second control condition, if the engine RPM is increased over a reference range or if the elapsed time after the start of the engine exceeds the reference time, it may be determined that there is no need to perform the second control to stabilize the engine RPM.

That is, according to exemplary embodiments of the present disclosure, in order to more clearly determine whether there exists a cold situation in which the second control is substantially required, the engine RPM and the elapsed time after the start of the engine are considered in addition to the vehicle condition.

The reference range of the engine RPM may include an idle RPM after the engine starts and before the vehicle starts driving, and the reference range and the reference time may be variously determined based on experimental results.

Meanwhile, a control system of a turbocharger for a vehicle according to exemplary embodiments of the present disclosure includes a turbocharger 120 including an exhaust air control device 125 of which a closing amount is controlled to control an influence of exhaust air on rotations of a turbine, sensors 140 measuring a vehicle condition and an engine condition, and a controller 160 controlling the closing amount of the turbocharger 120 to be a first closing amount among cold closing amounts when the vehicle condition measured by the sensors 140 satisfies a first control condition among cold control conditions. The control system also includes linearly changing the closing amount of the turbocharger 120 from the first closing amount to a second closing amount that is set to be larger than the first closing amount when the vehicle condition satisfies a second control condition among the cold control conditions. The control system also includes controlling the closing amount of the turbocharger 120 to be the second closing amount when the vehicle condition satisfies the second control condition, and then controlling the closing amount of the turbocharger 120 according to the engine condition and using a cold data map having an allowable closing amount range that is expanded as compared to an allowable closing amount range of the turbocharger 120 set in a normal data map to include the cold closing amount when the vehicle condition satisfies a cold data map application condition to thereby continuously change the closing amount of the turbocharger 120 immediately after the cold control step S100 and prevent rapid changes in the engine RPM.

Describing in detail, the turbocharger 120 includes the exhaust air control device 125 of which the closing amount is controlled to control the influence of exhaust air on the rotation of the turbine. The turbocharger 120 includes the turbine rotating by the exhaust air and a compressor for compressing intake air that are embedded therein, and is provided with a rotating shaft on which the turbine and the compressor are mounted.

Further, as described above, the exhaust air control device 125 such as the vane angle control device for controlling a vane angle or a waste gate for controlling an amount of exhaust air is provided, such that an RPM of the turbocharger 120 may be determined to be different depending on the closing amount of the exhaust air control device 125 under the same engine condition.

Meanwhile, the sensors 140 are provided to measure the vehicle condition and the engine condition. The vehicle condition may include atmospheric pressure, atmospheric temperature, a vehicle speed, a pressed amount, or degree, of an accelerator pedal and/or cooling water temperature, and the like. The sensors 140 may include an atmospheric temperature sensor, an atmospheric pressure sensor, an accelerator pedal sensor, a vehicle speed sensor and/or a cooling water temperature sensor, and the like in order to measure the above vehicle conditions, respectively.

Further, the engine condition may include an engine RPM and an engine torque as described above, and the sensors 140 may include an RPM sensor for measuring the engine RPM. The engine torque that is a value that may be derived from a fuel injection amount or a pressed amount of an accelerator pedal, may be measured through a fuel injection amount sensor or the accelerator pedal sensor.

Meanwhile, The controller 160 controls the closing amount of the turbocharger 120 to be a first closing amount among cold closing amounts when the vehicle condition measured by the sensors 140 satisfies a first control condition among cold control conditions, linearly changes the closing amount of the turbocharger 120 from the first closing amount to a second closing amount that is set to be larger than the first closing amount when the vehicle condition satisfies a second control condition among the cold control conditions, controls the closing amount of the turbocharger 120 to be the second closing amount when the vehicle condition satisfies the second control condition, and then controls the closing amount of the turbocharger 120 according to the engine condition and uses a cold data map having an allowable closing amount range that is expanded as compared to an allowable closing amount range of the turbocharger 120 set in a normal data map to include the cold closing amount when the vehicle condition satisfies a cold data map application condition to thereby continuously change the closing amount of the turbocharger 120 immediately after the cold control step S100 and prevent rapid changes in the engine RPM.

According to the control method and the control system of a turbocharger for a vehicle in accordance with exemplary embodiments of the present disclosure, it is possible to promote stable driving of the turbocharger at the time of cold start and prevent rapid changes in a closing amount of the turbocharger at the same time, thereby effectively preventing rapid changes in an engine RPM.

In particular, according to the present disclosure, the turbocharger is cold controlled by the cold start situation, and the cold data map in which the allowable range of the closing amount of the turbocharger, that is controlled depending on the target boost pressure of intake air after the cold control, is set to be wider than that of the normal data map in which the allowable closing amount range of the turbocharger is set, is applied according to the engine condition. This ensures that the change in the closing amount of the turbocharger is continuous, thereby effectively preventing a rapid change in an engine RPM from being generated.

Further, according to the present disclosure, as the cold control, the first control and the second control that have different closing amounts of turbocharger are performed, and between the first control and the second control, the linear change step of linearly performing the change in the closing amount of the turbocharger is performed, such that it is possible to effectively prevent rapid changes in an engine RPM during the cold control.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A control method of a turbocharger for a vehicle, comprising:
    a cold control step of controlling, by a controller, a closing amount of a turbocharger to be a cold closing amount preset for a cold control when a vehicle condition satisfies a cold control condition; and
    a cold data map application step of controlling, by the controller, the closing amount of the turbocharger according to an engine condition after the cold control step, and using a cold data map having an allowable closing amount range expanded relative to an allowable closing amount range of the turbocharger in a normal data map to include the cold closing amount when the vehicle condition satisfies a cold data map application condition, and to thereby continuously change the closing amount of the turbocharger after the cold control step and prevent rapid changes in an engine RPM,
    wherein the controller controls the closing amount of the turbocharger by controlling a closing amount of an exhaust air control device as a part of the turbocharger,
    wherein the exhaust air control device includes at least one of a waste gate for controlling an amount of exhaust air introduced into the turbocharger or a vane angle control device for controlling kinetic energy of the exhaust air applied to the turbine of the turbocharger,
    wherein in the cold data map application step, the controller continuously changes the closing amount of the turbocharger while limiting a change rate of the closing amount of the turbocharger, immediately after the cold control step, to a predetermined reference change rate or lower, and
    wherein the predetermined reference change rate is a value determined by experimentally or theoretically deciding an allowable level of change in the engine RPM and specifying a change rate of the closing amount of the turbocharger satisfying the allowable level.

2. The control method of a turbocharger for a vehicle as set forth in claim 1, wherein the vehicle condition includes at least one of cooling water temperature, a vehicle speed, atmospheric pressure, atmospheric temperature, or a pressed degree of an accelerator pedal.

3. The control method of a turbocharger for a vehicle as set forth in claim 1, wherein the cold control step includes a first control step of controlling, by the controller, the closing amount of the turbocharger to be a first closing amount among the cold closing amounts when the vehicle condition satisfies a first control condition among the cold control conditions, and the cold control step further includes a second control step of controlling, by the controller, the closing amount of the turbocharger to a second closing amount that is set to be larger than the first closing amount among the cold closing amounts when the vehicle condition satisfies a second control condition among the cold control conditions after the first control step.

4. The control method of a turbocharger for a vehicle as set forth in claim 3, wherein in the first control step, the first closing amount is set to have a value smaller than the closing amount of the turbocharger that is determined according to the engine condition at the same point in time.

5. The control method of a turbocharger for a vehicle as set forth in claim 3, wherein the cold control step further includes, between the first control step and the second control step, a linear change step of linearly changing, by the controller, the first closing amount that is the closing amount of the turbocharger immediately after the first control step to the second closing amount, when the vehicle condition satisfies the second control condition.

6. The control method of a turbocharger for a vehicle as set forth in claim 5, wherein in the linear change step, the controller determines a transition time of the closing amount of the turbocharger according to the first closing amount, the second closing amount and the vehicle condition, and changes the closing amount of the turbocharger from the first closing amount to the second closing amount during the transition time.

7. The control method of a turbocharger for a vehicle as set forth in claim 3, wherein in the cold control step, the controller determines a duration of the first control step and a duration of the second control step according to the vehicle condition.

8. The control method of a turbocharger for a vehicle as set forth in claim 3, wherein in the second control step, when the engine RPM is within a reference range and an elapsed time after a start of an engine is within a predetermined time, if the vehicle condition satisfies the second control condition, the controller controls the closing amount of the turbocharger to be the second closing amount.

9. A control system of a turbocharger for a vehicle, comprising:
    a turbocharger including an exhaust air control device of which a closing amount is controlled to control an influence of exhaust air on a rotation of a turbine;
    sensors for measuring a vehicle condition and an engine condition; and
    a controller for controlling the closing amount of the turbocharger to be a first closing amount among cold closing amounts when the vehicle condition measured by the sensors satisfies a first control condition among cold control conditions, linearly changing the closing amount of the turbocharger from the first closing amount to a second closing amount that is larger than the first closing amount when the vehicle condition satisfies a second control condition among the cold control conditions, controlling the closing amount of the turbocharger to be the second closing amount when the vehicle condition satisfies the second control condition, and then controlling the closing amount of the turbocharger according to the engine condition and using a cold data map having an allowable closing amount range that is expanded relative to an allowable closing amount range of the turbocharger in a normal data map to include the cold closing amount when the vehicle condition satisfies a cold data map application condition to continuously change the closing amount of the turbocharger immediately after a cold control step controlled by the controller and prevent a rapid change in the engine RPM,
    wherein the exhaust air control device includes at least one of a waste gate for controlling an amount of exhaust air introduced into the turbocharger or a vane angle control device for controlling kinetic energy of the exhaust air applied to the turbine of the turbocharger,
    wherein the controller continuously changes the closing amount of the turbocharger while limiting a change rate of the closing amount of the turbocharger, immediately after the cold control step, to a predetermined reference change rate or lower, and wherein the predetermined reference change rate is a value determined by experimentally or theoretically deciding an allowable level of change in the engine RPM and specifying a change rate of the closing amount of the turbocharger satisfying the allowable level.

* * * * *